W. SHERIDON.
AUTOMATIC MOLD FEEDING APPARATUS FOR BRICK MOLDING MACHINES.
APPLICATION FILED NOV. 24, 1913.
1,273,008.
Patented July 16, 1918.
11 SHEETS—SHEET 3.
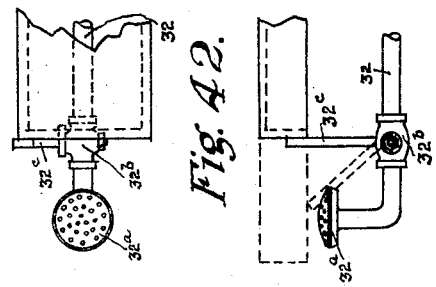
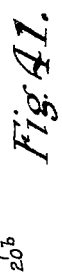
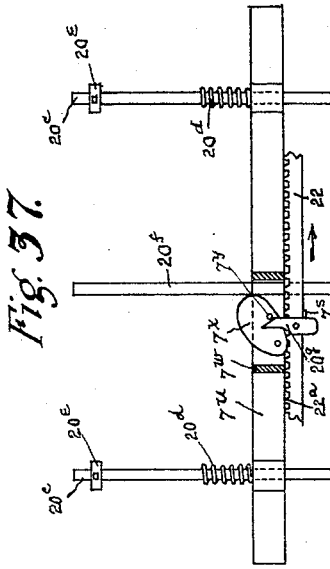
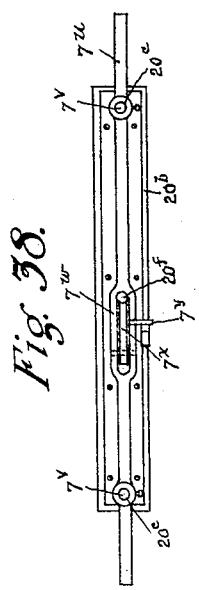
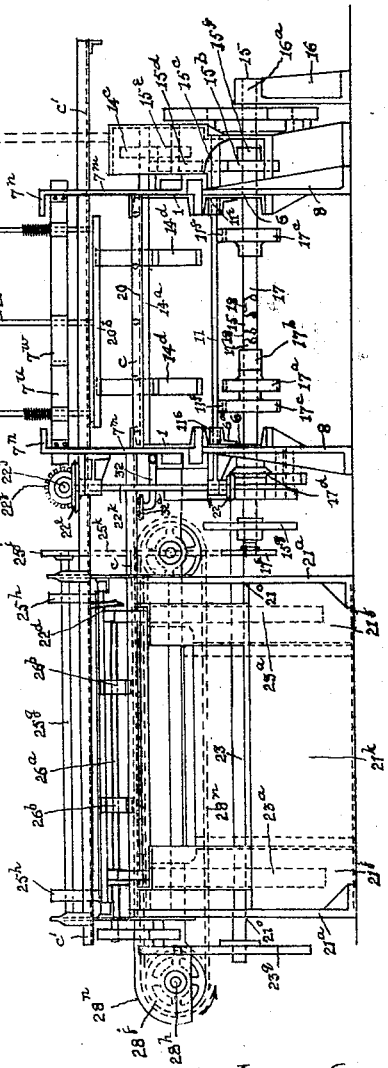
Witnesses
Inventor
William Sheridon
by Robt. B. Wilson
Attorney

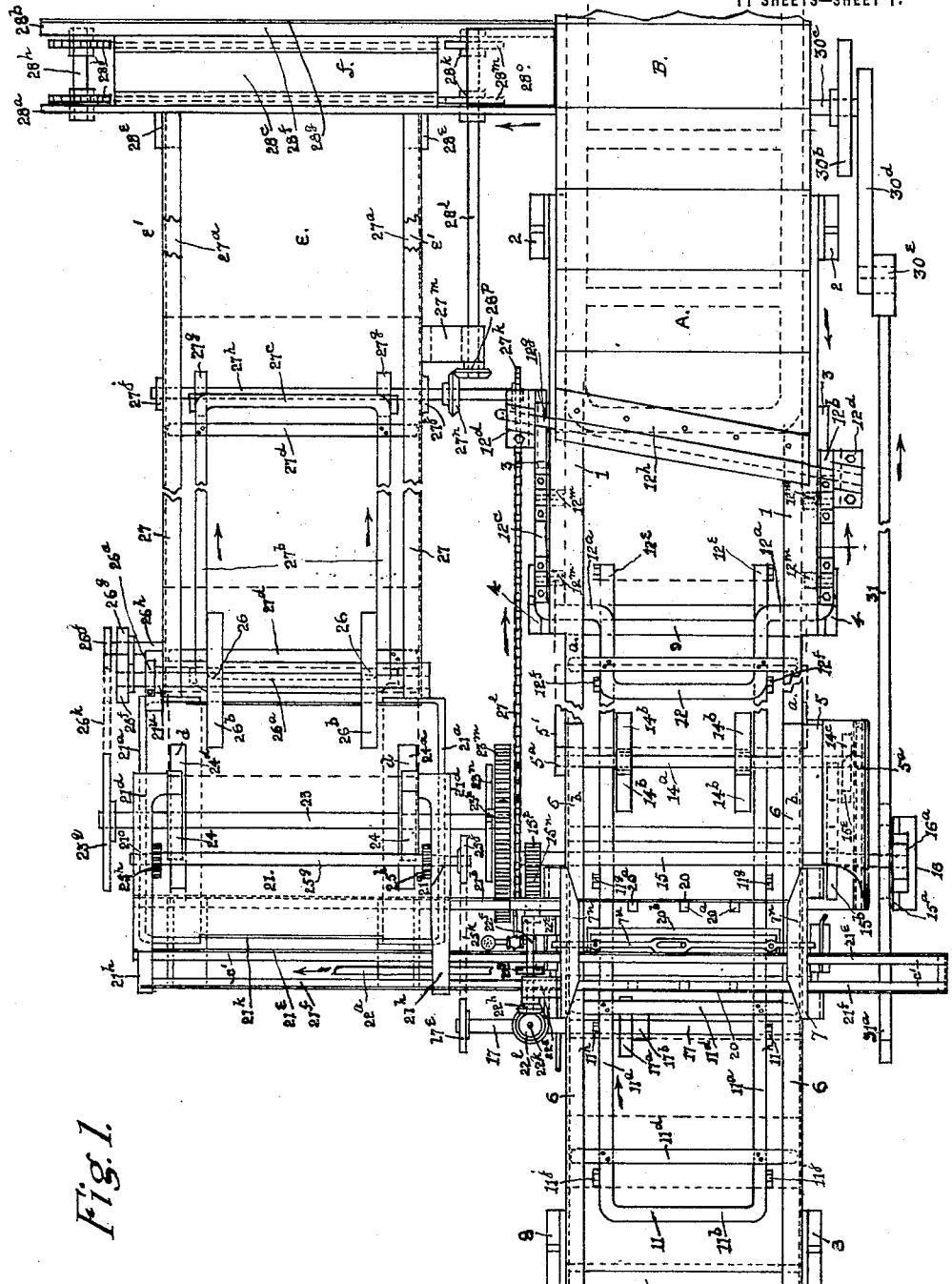

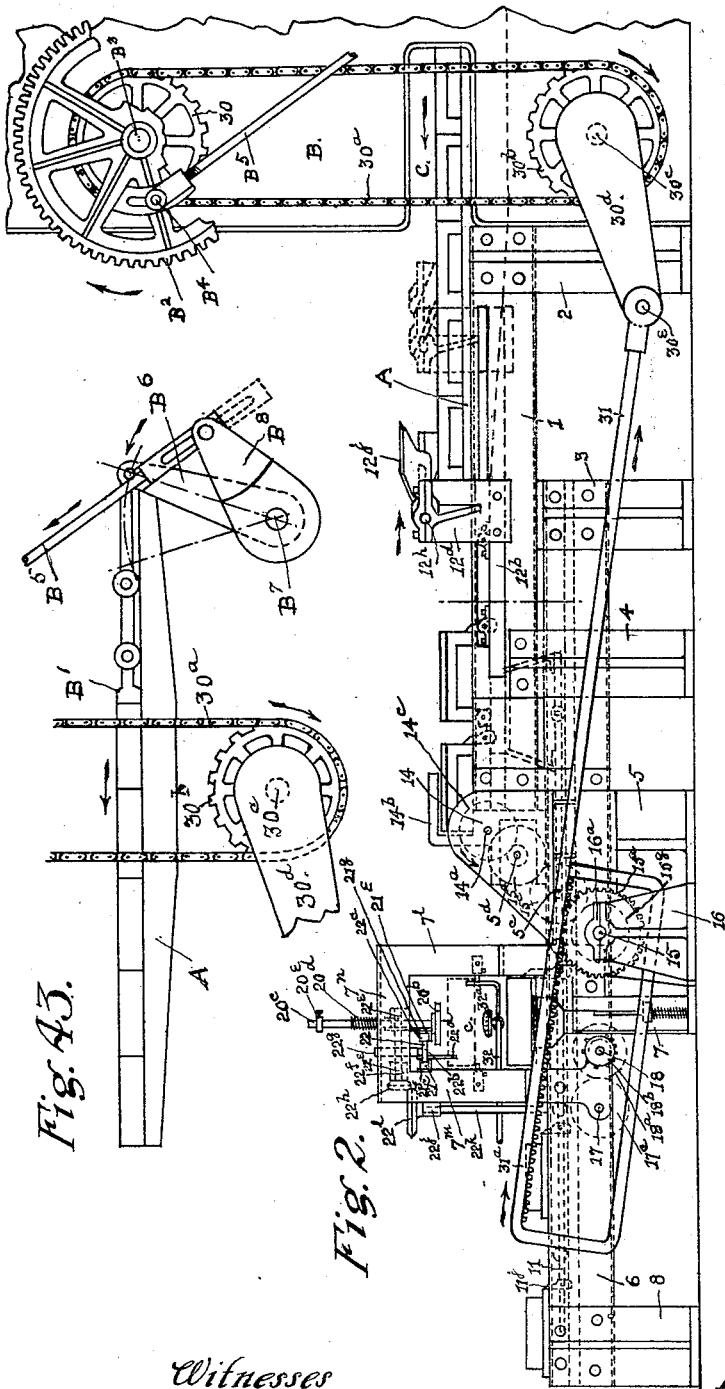
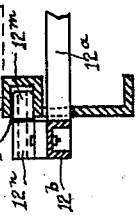
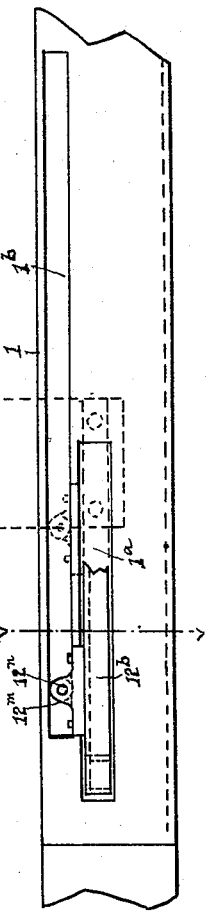

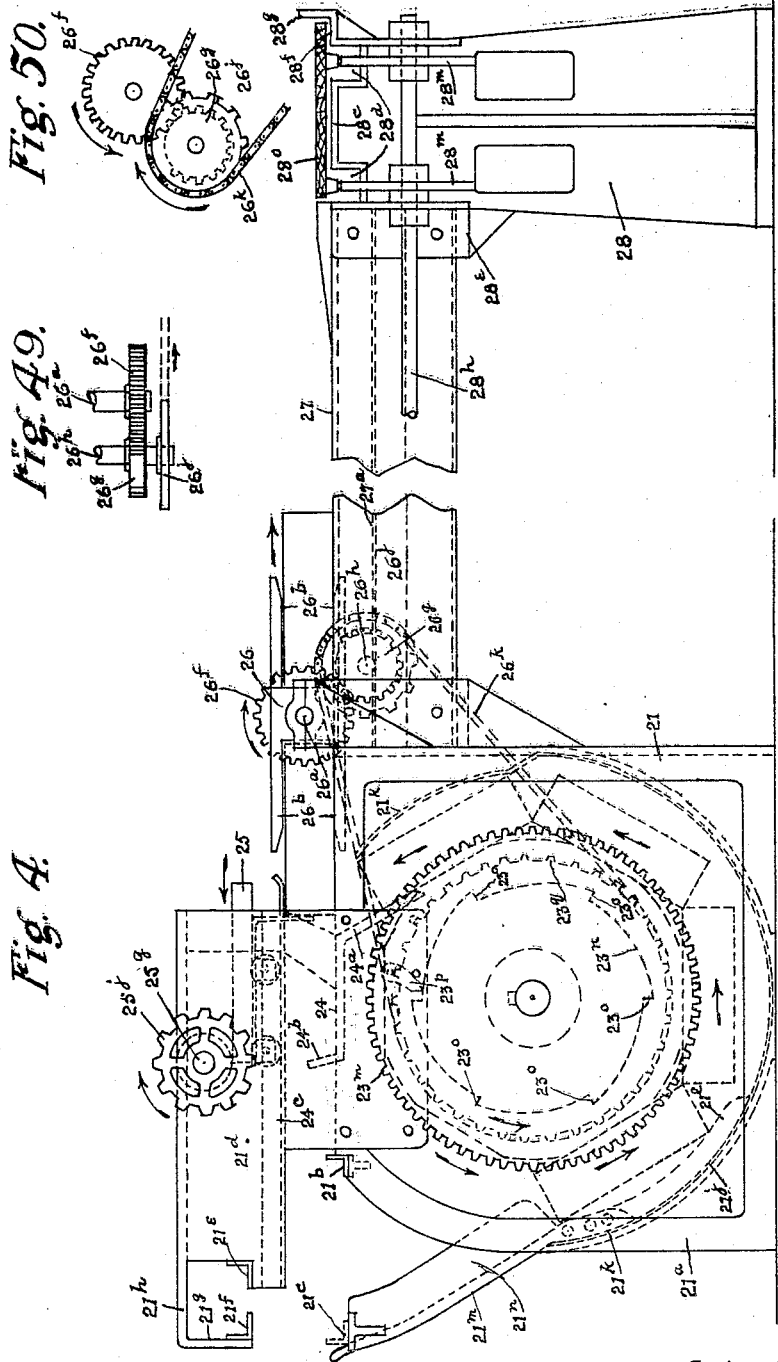

W. SHERIDON.
AUTOMATIC MOLD FEEDING APPARATUS FOR BRICK MOLDING MACHINES.
APPLICATION FILED NOV. 24, 1913.
1,273,008.
Patented July 16, 1918.
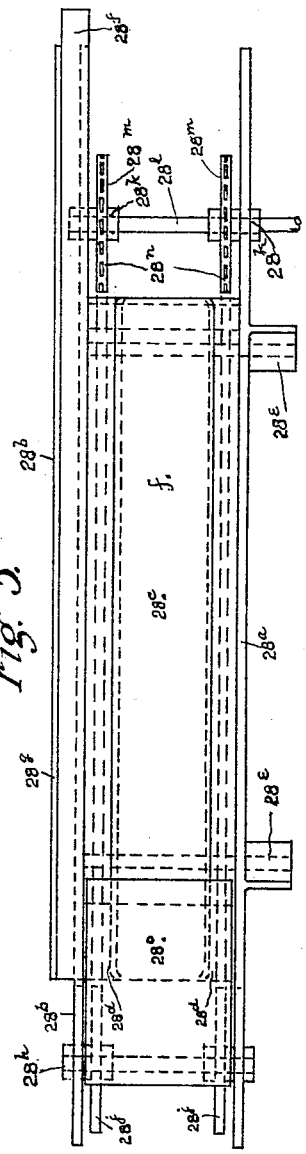
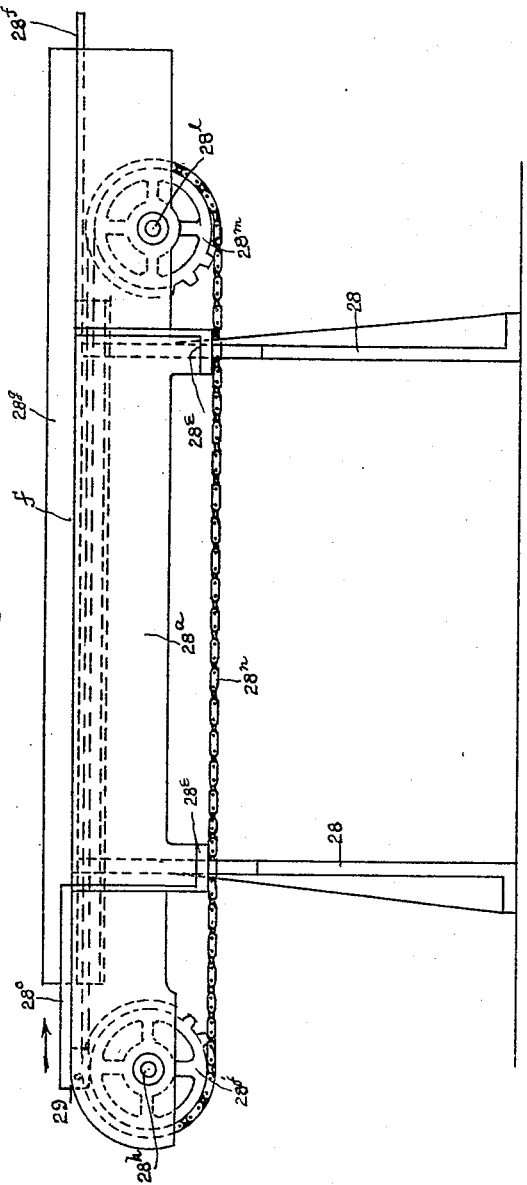

W. SHERIDON.
AUTOMATIC MOLD FEEDING APPARATUS FOR BRICK MOLDING MACHINES.
APPLICATION FILED NOV. 24, 1913.
1,273,008.
Patented July 16, 1918.
11 SHEETS—SHEET 6.
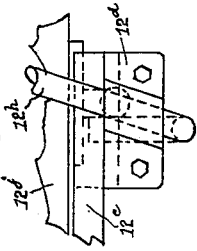
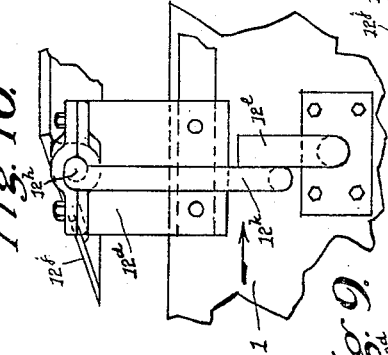
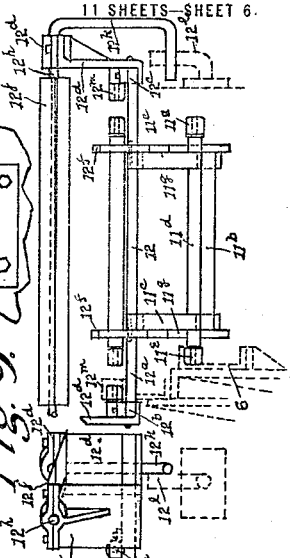
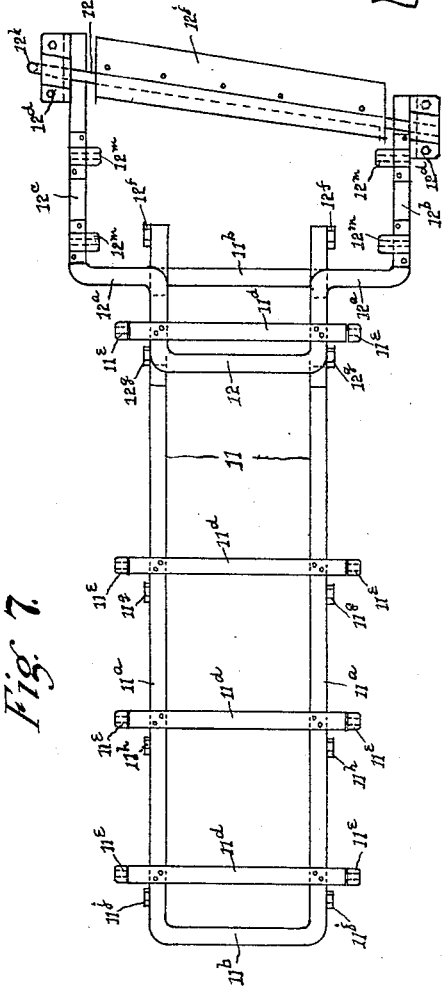
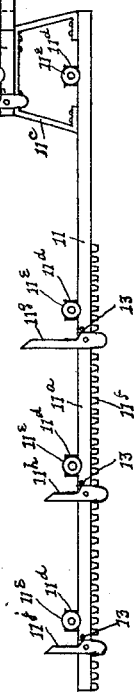
Witnesses
Inventor
William Sheridon
by Rob't B. Wilson
Attorney W. SHERIDON.
AUTOMATIC MOLD FEEDING APPARATUS FOR BRICK MOLDING MACHINES.
APPLICATION FILED NOV. 24, 1913.
1,273,008.
Patented July 16, 1918.
11 SHEETS—SHEET 7.
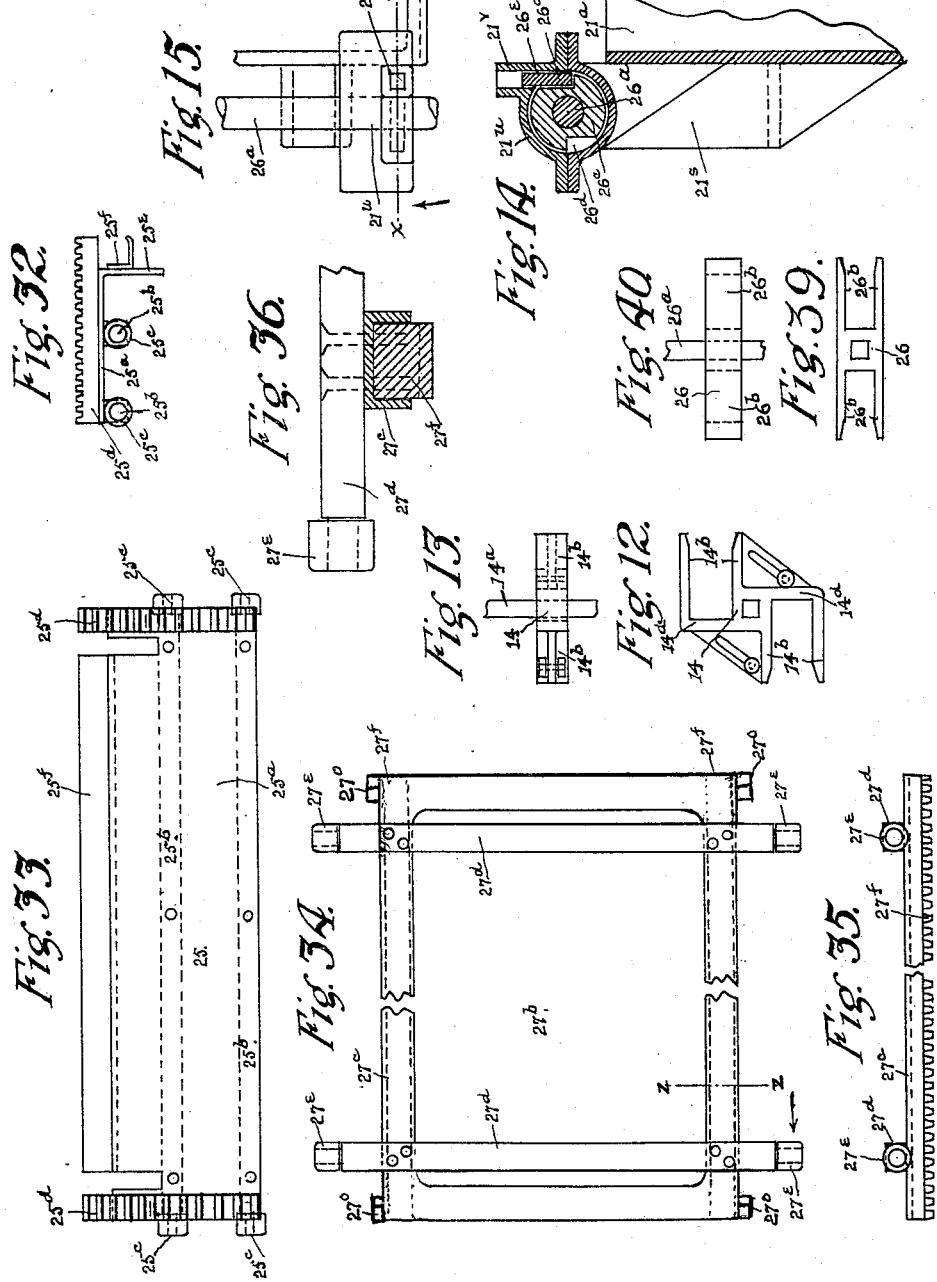

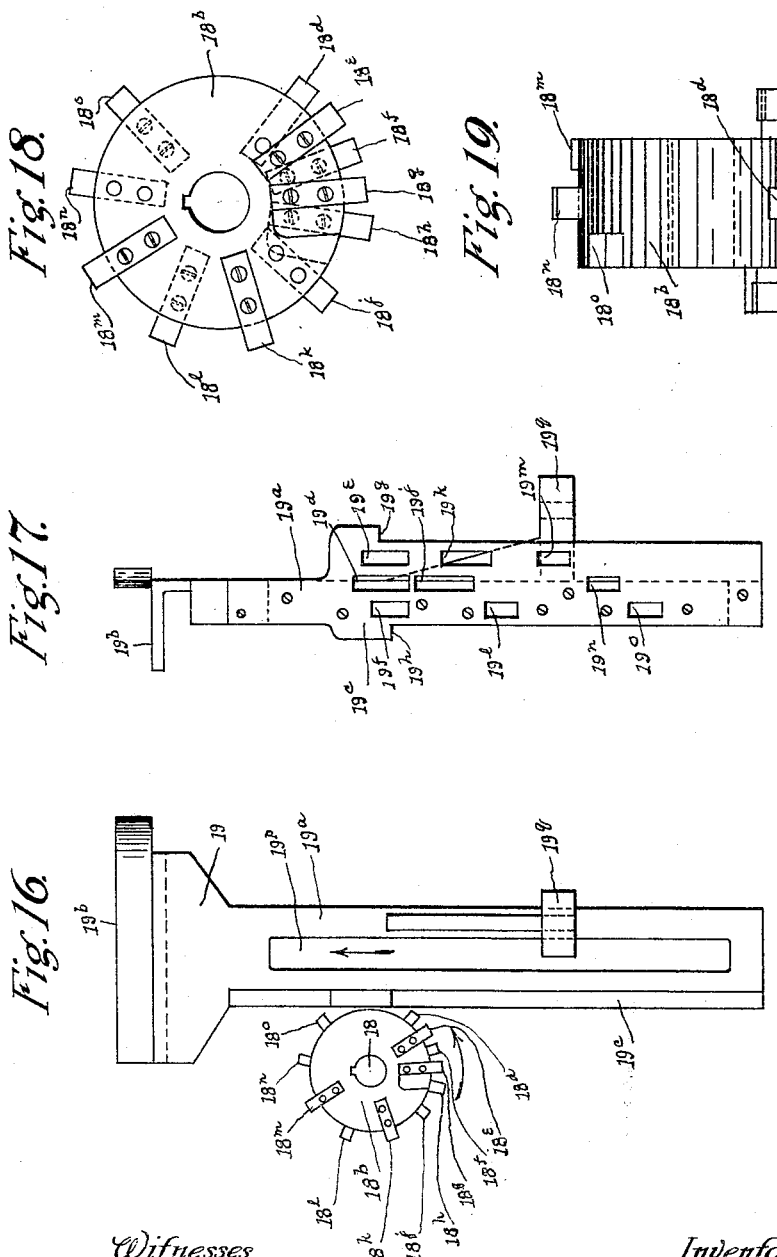

W. SHERIDON.
AUTOMATIC MOLD FEEDING APPARATUS FOR BRICK MOLDING MACHINES.
APPLICATION FILED NOV. 24, 1913.
1,273,008.
Patented July 16, 1918.
11 SHEETS—SHEET 9.
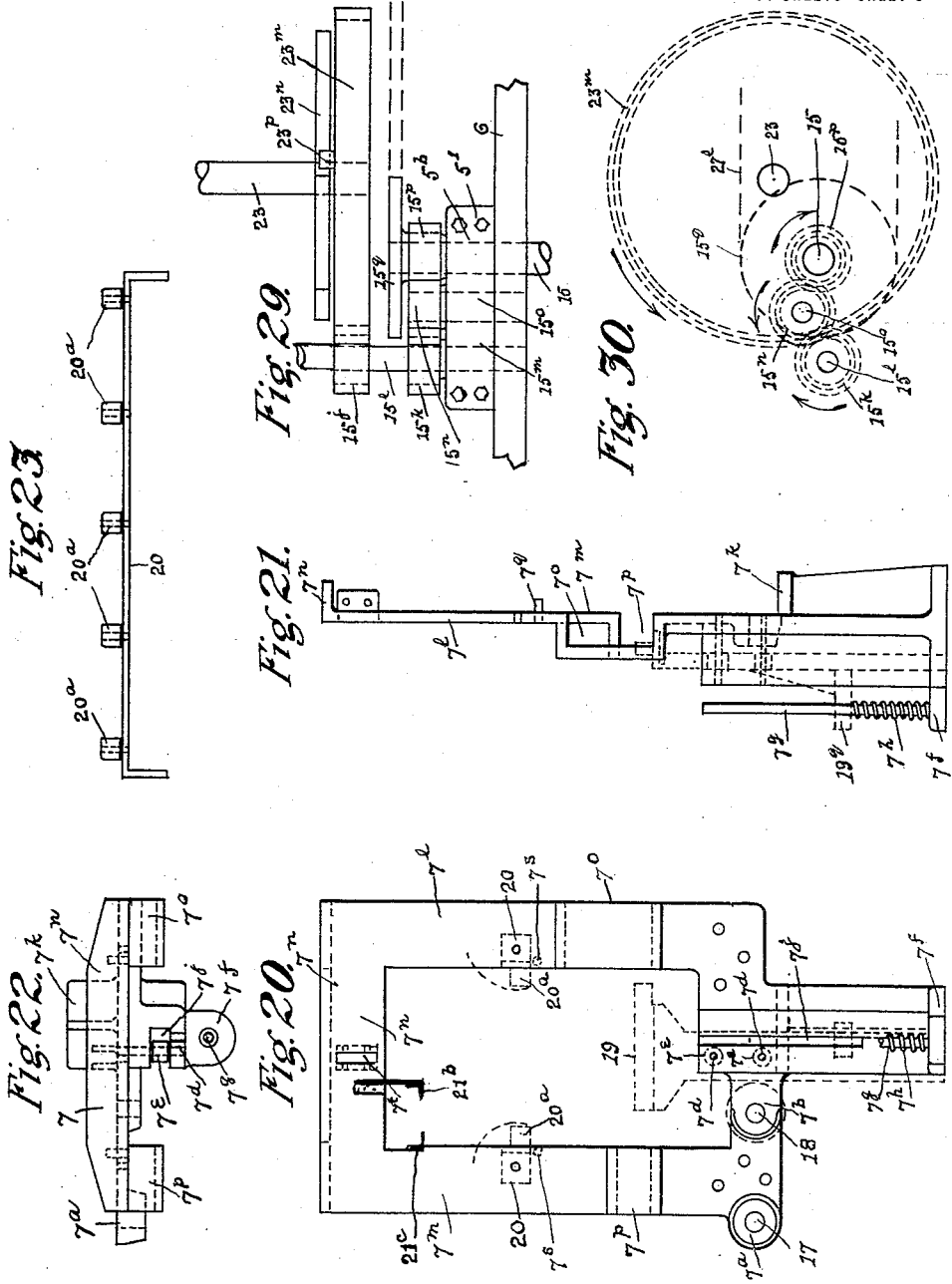

W. SHERIDON.
AUTOMATIC MOLD FEEDING APPARATUS FOR BRICK MOLDING MACHINES.
APPLICATION FILED NOV. 24, 1913.
1,273,008.
Patented July 16, 1918.
11 SHEETS—SHEET 10.
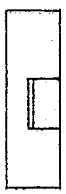
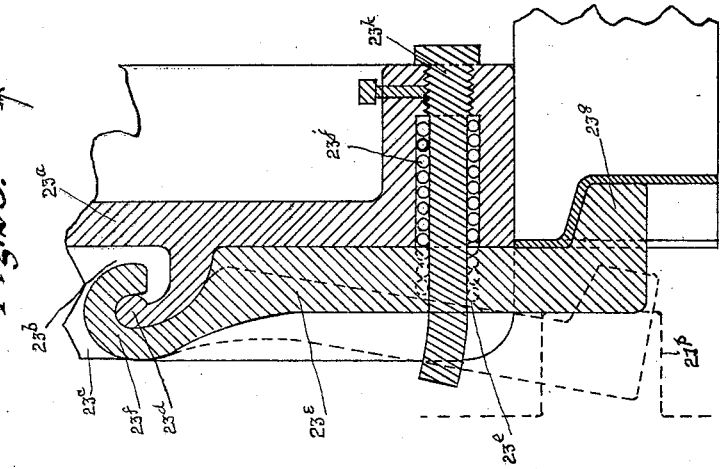
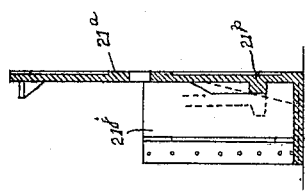
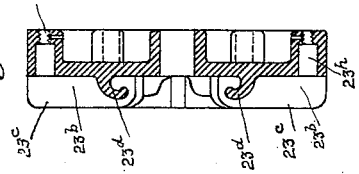
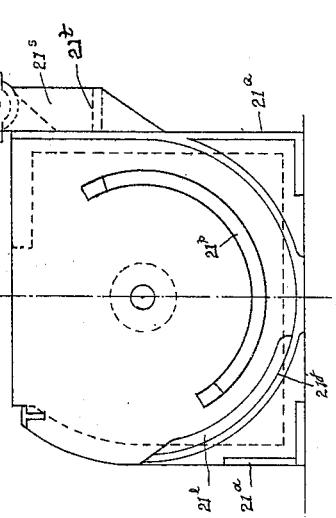
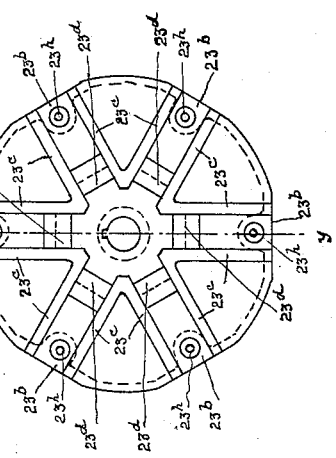
Witnesses
Inventor
William Sheridon
by Rob't Wilson
Attorney W. SHERIDON.
AUTOMATIC MOLD FEEDING APPARATUS FOR BRICK MOLDING MACHINES.
APPLICATION FILED NOV. 24, 1913.
1,273,008.
Patented July 16, 1918.
11 SHEETS—SHEET 11.
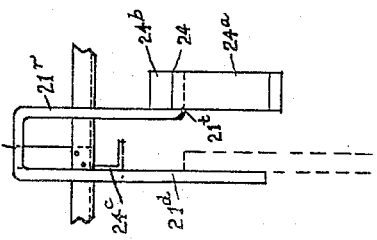
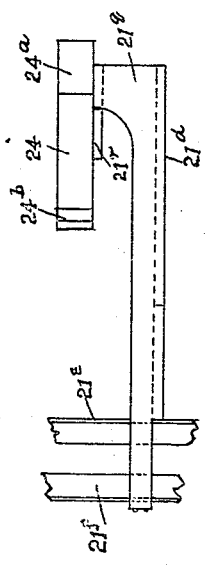
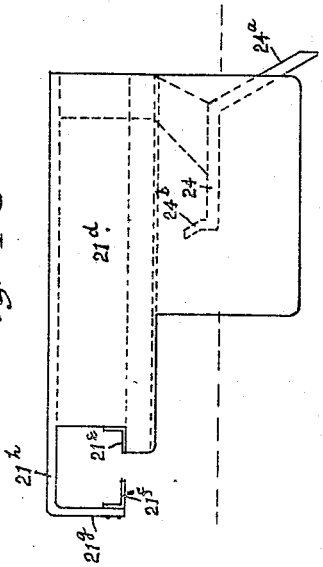

UNITED STATES PATENT OFFICE.

WILLIAM SHERIDON, OF TOLEDO, OHIO.

AUTOMATIC MOLD-FEEDING APPARATUS FOR BRICK-MOLDING MACHINES.

1,273,008.  Specification of Letters Patent.  Patented July 16, 1918.

Application filed November 24, 1913. Serial No. 802,628.

*To all whom it may concern:*

Be it known that I, WILLIAM SHERIDON, a citizen of the United States, residing at Toledo, in the county of Lucas and State of Ohio, have invented new and useful Improvements in Automatic Mold-Feeding Apparatus for Brick-Molding Machines, of which the following is a specification.

My invention relates to an automatic mold feeding apparatus for mud brick molding machines, and has for its object to provide an apparatus of the kind that it adapted when attached to a machine of the kind to automatically feed into the machine a series of molds, one at a time, and over and over again in regular order, and at regular periods as required for the operation of filling the molds of the machine, and that is adapted during the travel of the molds from and into the machine to automatically leave the brick formed in the mold on pallets convenient for offbearing and drying the brick.

Furthermore, to provide a machine of the kind with an apparatus of the kind that is adapted when attached and operatively connected to the machine, and provided with a series of molds, to render the molding machine automatic, both for the molding and delivery of brick on pallets convenient for handling and drying in all save supplying the machine with clay and the molds with pallets.

Furthermore, to provide an apparatus of the kind and for the purpose described, whereby the molds discharged from the machine are periodically and consecutively, in the order of their discharge from the machine, advanced by a series of stages, with a pause after each advance, over a circuitous path of travel from the apron to and into the mold feed opening of a machine, emptied and sanded for refilling.

I accomplish these objects by the construction, combination and connection of parts with themselves and with parts of a brick molding machine, as hereinafter described and illustrated in the drawings, in which—

Figure 1 is a top plan view of an apparatus constructed in accordance with my invention and connected to the apron and mold feed opening of a brick molding machine, a portion of which is shown.

Fig. 2 is a side elevation of the same, showing the side connected to the apron of the machine.

Fig. 3 is an end elevation of the same, showing the end farthest from the apron.

Fig. 4 is a side elevation of the sander and return sections, and an end elevation of the feed section of the mold track.

Fig. 5 is an enlarged top view of the feed section of the return track.

Fig. 6 is a side elevation of the same.

Fig. 7 is a top plan view of the mold shifter of the mold receiving section of the apparatus.

Fig. 8 is a side view of the same.

Fig. 9 is an end view of the same.

Fig. 10 is an enlarged broken away end view of the strike knife and its support, carried by the shifter.

Fig. 11 is a top view of the bearing of the knife axle.

Fig. 12 is a side view of an inverter yoke.

Fig. 13 is a top view of the same.

Fig. 14 is a section of the bearing of the inverter on line $x$—$x$ of Fig. 15.

Fig. 15 is a top view of the same.

Fig. 16 is a side view of an elevator jack and of a differential gear wheel for lifting the jack.

Fig. 17 is an edge view of the jack shown in Fig. 16, showing the recessed face engaged by the lifting wheel.

Fig. 18 is an enlarged view of the lifting wheel shown in Fig. 16.

Fig. 19 is a face view of the same.

Fig. 20 is a side elevation of an elevator frame.

Fig. 21 is an end view of the same.

Fig. 22 is a top view of Fig. 20.

Fig. 23 is a top view of a swing rail of the elevated section of the mold track.

Fig. 24 is a side elevation of one of the sides of the sander frame, showing the inner face.

Fig. 25 is a section of the same on line $w$—$w$ of Fig. 24.

Fig. 26 is a side view of a mold carrying wheel of the sander showing the outer face.

Fig. 27 is a section of Fig. 26 on line $y$—$y$.

Fig. 28 is an enlarged broken away portion of the lower end portion of Fig. 27, showing in section a lock block in position locking one end of a mold to the mold carrying wheel.

Fig. 29 is a top view of the gearing connecting the driving gear wheel of the sander with the main driving shaft.

Fig. 30 is a side diagrammatic view of the same.

Fig. 31 is a side view of a mold handle.

Fig. 32 is an end view of the mold shifter of the sander.

Fig. 33 is a top view of the same.

Fig. 34 is a top view of the mold shifter of the return section of the mold track.

Fig. 35 is a side view of the same.

Fig. 36 is a cross section of the shifter frame shown in Fig. 34 on line z—z, with a broken away end portion of a roller axle attached to the same.

Fig. 37 is a side elevation of the drop hammer of the mold elevator.

Fig. 38 is a top view of the same.

Fig. 39 is a side view of an inverter yoke of the inverter attached to the sander.

Fig. 40 is a top view of the same.

Fig. 41 is a top view of the spraying nozzle.

Fig. 42 is a side view of the same.

Fig. 43 is a side view showing broken away portions of the apron, mold ejector, and connecting rod of the brick machine not shown in Fig. 2 and illustrating the position of the ejector relative to the main driving member of my apparatus in the position in which the latter is shown in Fig. 1.

Fig. 44 is an enlarged side view of a portion of the receiving section of the mold slide track.

Fig. 45 is a cross section of the same on line v—v.

Fig. 46 is a side view of a detached upper extension plate of the sander casing shown in Fig. 4.

Fig. 47 is a rear view of the same.

Fig. 48 is a top view of the same.

Fig. 49 is a top view of the driving gear wheel of the sander inverter, and

Fig. 50 is a side view of the same.

In the drawings B designates a brick molding machine, A its apron upon which the filled molds are discharged from the machine, and C the opening for feeding molds into the machine.

My apparatus comprises a slide track for a series of brick molds, the track being mounted on suitable supports, and extending in a circuitous path from the apron A to the mold feed opening C of the machine B, and comprising the receiving section $a$ having an extension $b$, the elevated transfer section $c$, the return sections $d$ and $e$, and a feed section $f$, each section being respectively provided with the means hereinafter described for advancing molds on the respective track sections, and from section to section, by a series of advances, with a pause after each advance, one mold following another from position to position in the order of their discharge from the apron A, to and into the mold feed opening C of the machine B.

The receiving track section $a$ comprises a pair of channel rails 1—1, secured to and supported by the supports 2—2, 3—3, 4—4 and 5—5' and the extension $b$ comprises a pair of parallel channel rails 6—6 secured to and supported by the supports 3—3, 4—4, 5—5' and the supports 7—7 and 8—8.

The supports 8—8 and 4—4 are provided with cross connections 10 and 9 respectively and the supports 2—2 are connected to the sides of the frame of the apron A, which forms a cross connection for the supports 2—2.

The channel rails 1—1 are secured to the supports aforesaid with the channels inward and are stepped down slightly below the level of the top of the apron A.

Between the supports 4—4 and the supports 5—5' the front end portions of the rails 1—1 are inset by right angles and between the angles and the apron A, the upper and lower flanges of the rails are widened to bring the inner edges in line with the inner edges of the flanges of the inset portions of the rails, and between the same points the rails 1 are each provided, (as more clearly shown in Figs. 45 and 46), with longitudinal slots $1^a$ and a recessed channel $1^b$ on their outer faces above the slots $1^a$ for a purpose hereinafter described.

The channel rails 6—6 are stepped down below the rails 1—1 and between the supports 5—5', and the supports 3—3 the rails 6—6 extend to the apron A without offset, and with the inner edges of their flanges in the same vertical planes with the inner edges of the flanges of the rails 1—1, which from the front edges of the apron A to the supports 2—2 are cut away in line with the sides of the apron frame.

The top flanges of the rails 1—1 from the front edge of the apron to the supports 5—5', and the two flanges of the rails 6—6, from the supports 5—5' to the supports 8—8, form a slide track for molds, each pair of rails being separated at distances adapting the end portions of the rails received from the apron A to rest on the flanges forming the track.

The rails 6—6 have secured thereto within their channels, at a suitable distance below their upper flanges, angle bars $6^a$ forming a sub-track for a mold shifter 11, which extends from the supports 8—8 to the supports 3—3.

The mold shifter 11 comprises an elongated frame preferably formed of a channel bar bent and welded at the ends to form the parallel sides $11^a$ and the ends $11^b$, (as shown in Fig. 7), and similar to the frame shown in Fig. 34. On the rear end portions of the sides $11^a$ are mounted and secured the bracket supports $11^c$ on which is mounted an auxiliary shifter frame 12 having the laterally and oppositely projecting arms 12ª, having end portions 12ᵇ and 12ᶜ respectively angled parallel rearward, and having secured to their rear end portions the knife bearings 12ᵈ.

To the top of the frame of the shifter 11 are transversely secured at intervals the axles 11ᵈ, which are provided at their ends with the rollers 11ᵉ which are supported and travel on the angle bars 6ª, and in the channels of the sides 11ª of the frame are secured the rack bars 11ᶠ. The arms 12ª of the frame 12 project through the slots 1ª of the rails 1, and have suitably mounted thereon and secured thereto stud journals upon which are journaled rollers 11ᵉ which project into the outer channels 1ᵇ of the rails 1 and travel therein, (as is more clearly shown in Fig. 46).

The front end portions of the sides 11ª of the shifter 11 are provided with three pairs of dogs 11ᵍ, 11ʰ, and 11ʲ and the corresponding sides 12ᶜ of the frame 12 near their front and rear ends are provided with two pairs of dogs 12ᶠ and 12ᵍ, each pair of dogs being pivoted to the respective frames and weighted at their lower ends to normally project the upper ends above the frame, and each dog is provided with a stop pin 13, which prevent rearward movement of the projecting upper portions past the vertical and permit forward movement of the same.

Thus constructed the shifter 11 carrying the frame 12 is reciprocable forward and backward on the rails 6ª and in the channels 1ᵇ of the rails 1—1 through the length of the slots 1ª of the rails 1.

In the knife bearings 12ᵈ is rotatably mounted the axle 12ʰ of a strike knife 12ʲ, the axle being provided at one end with a crank trip extension 12ᵏ, and to the adjacent rail 1 is secured a trip pin 12ˡ, which is engaged by the crank 12ᵏ on the forward movement of the shifter 11, and tilts the edge of the knife upward and the back downward for a purpose hereinafter described.

The supports 5 and 5' are provided with alined bearings 5ª in which is mounted a mold inverter 14, comprising an axle 14ª having fixedly mounted thereon a pair of inverter yokes, each yoke comprising two pairs of parallel arms 14ᵇ, each pair projecting oppositely to the other from opposite sides of the axle, and adapted to receive a mold from the rails 1—1 and in one half a revolution of the axle deliver the mold inverted on the rails 6—6.

The supports 5—5' are also provided with the alined bearings 5ª in which is journaled the driving shaft 15, an extension of which is journaled in a bearing 16ª of a pillar 16 opposite and adjacent to the support 5.

Between the bearings 16ª and the support 5 there is fixedly mounted on the shaft 15 a driving gear wheel 15ª and within the support 5, which is also a gear casing, there is mounted on the shaft 15 a gear wheel 15ᵇ. The support 5 is also provided with pins 5ᶜ and 5ᵈ on which are respectively journaled the idler gear wheels 15ᶜ and 15ᵈ, of equal diameter as the wheel 15ᵇ. The wheel 15ᵈ has fixedly mounted on its hub a pinion 15ᵉ which intermeshes with a gear wheel 14ᶜ on the inverter axle 14ª, the wheel 14ᶜ being of a diameter adapting it to be revolved by the pinion a half a revolution in the direction shown by the arrow in Fig. 2.

The gear wheel 15ᵇ is loosely mounted on the driving shaft 15 and adjacent thereto on the driving shaft is slidably mounted a spring actuated clutch collar 15ᶠ, adapted to engage a companion clutch member carried by the hub of the wheel 15ᵇ, the clutch members having cam faces adapted to separate the members against the resistance of the spring when the shaft is revolved in one direction, and to interlock when revolved in the opposite direction.

Directly beneath the rack bars 11ᶠ of the shifter 11 there are fixedly mounted on the driving shaft 15 the gear wheels 15ᵍ, which intermesh with the racks, and as the driving gear wheel 15ª is revolved alternately in opposite directions as hereinafter described, the shifter 11 is reciprocated forward and backward in the ways 6ª and 1ᵇ of the rails 6—6 and 1—1 hereinbefore described.

In the supports 7—7 are provided a pair of alined bearings 7ª in which is mounted a counter shaft 17, and between shaft 17 and the driving shaft 15 of the supports 7—7 are provided with a pair of alined bearings 7ᵇ in which is mounted a shaft 18, and on the shaft 17 is loosely mounted a gear wheel 17ª having a hub adapted as a clutch member, and adjacent thereto is slidably mounted on the shaft 17, a spring actuated clutch collar 17ᵇ that is normally adapted to engage the clutch members while the shaft is revolving in one direction, and that is provided with a cam face that is adapted to automatically disengage the clutch members when the shaft revolves in the opposite direction. There is also fixedly mounted on the shaft 18 a gear wheel 18ª of the same diameter as the wheel 17ª, and intermeshing therewith, whereby, when the shaft 17 is revolved in one direction, the shaft 18 is revolved in the opposite direction, and when the shaft 17 is revolved in the other direction, the shaft 18 stands still for a purpose hereinafter described.

On the shaft 17 is fixedly mounted the gear wheels 17ᶜ of equal diameter with the gear wheels 15ᵍ on the shaft 15. The gear wheels 17ᶜ also intermesh with the racks 11ᶠ of the shifter 11 and as the shifter 11 is reciprocated by the driving shaft 15, the shaft 17 is alternately revolved one revolution forward and one backward, and as arranged in my apparatus, during the backward revolution of the shaft 17, the shaft 18 is revolved one revolution forward.

In the supports 7—7 are slidably mounted in suitable ways $7^c$ a pair of elevator jacks 19 comprising the stems $19^a$ and the lifting heads $19^b$. The front faces $19^c$ of the stems are provided with rack recesses $19^d$, $19^e$, $19^f$, side ledges $19^g$, $19^h$ and recesses $19^j$, $19^k$, $19^l$, $19^m$, $19^n$ and $19^o$, the upper ends of the recesses being square shoulders by which the jacks are lifted, and the recesses and ledges aforesaid are arranged in the order and relation as shown in Fig. 17.

On opposite end portions of the shaft 18 are fixedly keyed the lifting wheels $18^b$ having inset teeth bars $18^d$, $18^e$, $18^f$, $18^g$, $18^h$, $18^j$, $18^k$, $18^l$, $18^m$, $18^n$ and $18^o$ projecting from the wheel in the order and radial relation to the circumference of the wheel, as shown in Figs. 18 and 19, and corresponding with the location of the recesses and ledges of the stems $19^a$ designated by numbers having corresponding letters.

One of the wheels $18^b$ is keyed to the shaft slightly in advance of the other whereby one of the jacks is successively engaged by the lifting arms of its wheel $18^b$ slightly in advance of the engagement of the other jack by corresponding lifting arms of the other wheel, and the lifting arms are in the order of the letters designating them, adapted to lift the adjacent jack with a short pause between its lifting by the next succeeding arm, whereby each jack is lifted by successive distinct lifts, and the lifts of one jack alternate with the lifts of the other, the purpose of which is hereinafter described.

The stems of the jacks 19 are each provided with the longitudinal guide slot $19^p$, and the supports 7—7 are provided with pins $7^d$ extending through the slots $19^p$ and having mounted thereon the rollers $7^e$ which form guides for retaining the jacks in the ways $7^c$.

The supports 7—7 are also provided with a foot $7^f$ in which is mounted a guide rod $7^g$, which is provided with a cushion spring $7^h$, and the jacks 19 are provided with lugs $19^q$ having guide holes $19^r$ by which the jacks are mounted on the guide rods $7^g$, whereby, when the jacks are raised and dropped the lugs $19^q$ engage the spring cushions which break their fall. The supports 7—7 opposite the guide rods $7^b$ are provided with the slots $7^j$ through which the body of the lugs $19^q$ pass as the jacks are raised and dropped.

The supports 7—7 on their inner faces are also provided with the bracket ledges $7^k$ upon which the rails 6—6 are supported (as shown in Fig. 21), and integral with each support 7 is an upper frame comprising the standard plates $7^l$ and $7^m$ and the top cross plate $7^n$. The rear standard plates $7^l$ at the top of the rails 6—6 are provided with the right angled offsets $7^o$ adapted to permit the handles of a mold sliding on the rails 6—6 to pass the standards, and the front standard plates $7^m$ are provided with right angles offsets $7^p$, adapted in height above the rails to permit the ends of a pallet sliding on the rails 6—6 to pass these standards, but adapting the standards to stop the mold with the handles in position to be engaged and lifted by the elevator jacks.

At equal heights above the rails 6—6 the standards $7^l$ and $7^m$ are provided with bearing pins $7^q$ in which are pivoted the right angled end portions $7^r$ of swinging track rails 20, having at regular intervals inwardly projecting pins on which are mounted the rollers $20^a$. The rails are held by gravity on stop pins $7^s$ with the rollers in horizontal position, and forming a track for molds operating as hereinafter described, and being one end portion of sections $c$ of the mold slide track.

The other end portion of the track sections $c$ comprises the angle bar rails $21^b$ and $21^c$ forming extensions of the swing rails 20. The rail $21^b$ at its inner end is secured to the standard plate $7^l$ of the inner support 7, and extends transversely over and is secured to the end plates $21^a$ of a sander casing 21. the rail $21^c$ at its inner end is secured to the standard $7^m$ of the inner support 7 and extends to the inner mold guide $21^m$ secured to the inner end plate $21^a$ of the sander casing 21.

Above the mold track section $c$ is a shifter track $c'$ comprising the angle bar rails $21^e$ and $21^f$ which extend transversely over the sander casing to and beyond the outer rail 6 of the track section $b$. The rail $21^e$ is supported by top extension plates $21^d$ of the end plates $21^a$ of the sander casing, and by the standard plate $7^m$ of the supports 7, and the rail $21^e$ is supported by the bracket extensions $21^h$ of the plates $21^d$, and by hangers $21^g$ from the top cross members $7^n$ of the supports 7.

On the shifter track $c'$ is reciprocably mounted a mold shifter 22 comprising the rack bar $22^a$, the axles $22^b$ secured transverse the back of the rack bar with the teeth of the rack bar uppermost, and the rollers $22^c$ mounted on the axles, and adapted to movably support the shifter 22 on the track $c'$. To the rack bar $22^a$, and forward of and adjacent to the rear axle $22^b$, is pendently pivoted the dog $22^d$, which is prevented from swinging in one direction from the vertical by the rear axle, but is free to swing upward in the opposite direction, for the purpose hereinafter described.

To the upper cross member $7^n$ of the support 7 next adjacent to the sander casing, are secured bracket bearings $22^c$ in which is journaled a horizontal shaft $22^f$ having fixedly mounted thereon over and intermeshing with the rack bar of the shifter 22, a gear wheel $22^g$, and on the outer end of the shaft $22^f$ is fixedly mounted a bevel gear wheel $22^h$, and in the alined upper and lower bracket bearings $22^j$ secured to the same support 7 is journaled the vertical shaft $22^k$, on the upper end of which is fixedly mounted the bevel gear wheel $22^l$, which intermeshes with the bevel gear wheel $22^h$, and on the lower end of the shaft $22^k$ is fixedly mounted a bevel gear wheel $22^m$, which intermeshes with a bevel gear wheel $17^d$, adapted in one revolution of the shaft 17, through the bevel gear wheels last described, to revolve the gear wheel $22^g$ a sufficient number of revolutions to reciprocate the shifter 22 from a position in which the dog $22^d$ is outside the outer elevator jack 19, to a position where the shifter is over the sander casing with the dog $22^d$ at the inner end $21^a$, of the sander casing and vice versa, and the shifter 22 is so mounted on the track $c'$ relative to the shifter 11 of the track section $a$ and $b$, that when the shifter 11 moves forward, the shifter 22 moves forward from over the elevator jacks to and over the sander casing, and when the shifter 11 moves rearward toward the apron A, the shifter 22 moves from over the sander casing to and over the elevator jacks.

The upper cross members $7^n$ are also provided with alined openings $7^t$, in which are secured the end portions of a support bar $7^u$, which extends horizontally and centrally above the swing track rails 20. The bar $7^u$, near the members $7^n$, is provided with the guide holes $7^v$, and central of its length with the vertically slotted enlargement $7^w$, in which near one end of the slot is pivoted the lock cam plate $7^x$ having a lateral pin $7^y$ near its free end portion.

Below the support bar $7^u$ and normally above the swing track rails 20 is a drop hammer plate $20^b$ having near its ends the guide rods $20^c$, extending vertically upward through the guide holes $7^v$, and having mounted thereon above the support $7^u$, the helical cushion springs $20^d$, and at their top end portions the adjustable stop collars $20^e$. Centrally the hammer plate $20^b$ is provided with the lock rod $20^f$, which extends upward through the slot of the enlargement $7^w$ of the support bar $7^u$ between the free end of the cam plate $7^x$ and the end of the slot, whereby the weight of the hammer plate and the cam plate automatically locks and suspends the hammer plate in whatever position it is raised.

The rack bar of the shifter 22 has pivotally mounted thereon a dog $20^g$ weighted to hold it normally vertical but adapted to swing backward on the forward movement of the shifter, and provided with a stop pin (not shown) to prevent it swinging in the opposite direction.

The dog $20^g$ is located on the rack bar at a point adapting it to engage the pin $7^y$ of the cam lock plate $7^x$ at the beginning of the backward movement of the shifter 22, whereby the lock plate is raised and held raised by the dog long enough to permit the hammer plate $20^b$ to drop until arrested by the stop collars $20^e$ engaging the cushion springs $20^d$.

The ends $21^a$ of the sander casing are provided with alined bearings $21^o$, in which is journaled a shaft 23, on which are fixedly mounted a pair of mold carrying wheels $23^a$, one adjacent to each end of the sander casing and within the casing. The ends $21^a$ of the sander casing are provided on their inner faces with the semi-circular flanges $21^j$, to which are secured the end portions of the semi-circular plate $21^k$ concentrically to the carrying wheels $23^a$, and forming the bottom and sides of the sander casing 21. The rear portions of the flanges $21^j$ have integral therewith the inwardly projecting radial guide flanges $21^l$, also concentric to the wheels $23^a$, and above and extending outward and upward from the ends of the casing, in line with the flanges $21^j$ are the mold guides $21^m$, having the side flanges $21^n$, adapted to direct a mold onto the flanges $21^l$ in falling from the rail $21^c$ of the section $c$ of the mold slide track.

The mold carrying wheels $23^a$ on their outer sides, are provided with six radial channels $23^b$, each having parallel sides formed by flanges $23^c$ which intersect around a common center of the channels, and across the inner ends of the channels the flanges are connected by the integral hook-shaped flanges $23^d$ for a purpose hereinafter described.

Opposite the outer end of each channel $23^b$ the periphery of the wheels $23^a$ are cut away on a line at right angles to the sides of the channels to form squared portions against which the end portions and top sides of the handles of a mold rest while being carried by the wheels $23^a$.

The ends $21^a$ of the casing are also each provided on their inner faces with a rib $21^p$ concentric to the shaft 23 and extending in part parallel with the flanges $21^l$ on the rear side of the casing, and parallel with and in part higher than the flanges $21^j$ on the front side (the front side being the side nearest the machine B and relative to the direction of movement of molds on the return sections $d$ and $e$).

To adapt the wheels $23^a$ for carrying molds around and through the bottom portion of the sander casing there is mounted on each of the hook flanges 23$^d$ within their respective channels a mold lock block 23$^e$ having at its inner end a hook portion 23$^f$, adapted to be pivotally engaged with the rounded edge of the flange 23$^d$ to rotate thereon through an arc of a circle. The outer ends of the lock blocks are each provided with a lock lug 23$^g$ which is adapted to enter a complementary recess formed in the handles of each mold used with the apparatus, (as shown in Fig. 31 and indicated by an arrow). In the outer end portion of each channel 23$^b$ the wheels 23$^a$ are provided with holes 23$^h$, which extend through the rim portion of the wheels, and are counterbored at the end next the channel to a suitable depth to receive the helical springs 23$^j$, and the remaining portions are exteriorly threaded to receive the threaded body portion next the head of bolts 23$^k$, which extend through the springs and through registering holes 23$^l$ in the lock blocks. The free end portions of the bolts are slightly curved to permit the lock block to be moved through an arc into the position shown in dotted lines in Fig. 28, by the springs 23$^j$ when the springs are expanded, and into the locked position shown in full lines by the rib 21$^p$, while passing through the lower portion of the sander casing.

On the end of the shaft 23, adjacent to the inner support 7, there is journaled a gear wheel 23$^m$, and on the shaft beside the wheel 23$^m$ is fixedly mounted a ratchet wheel 23$^n$, having six shoulder teeth 23$^o$ of equal intervals of its periphery and adapted to be engaged by a ratchet pawl 23$^p$ mounted on and carried by the gear wheel 23$^m$, when the latter is revolved rearward at the top and to revolve without engaging in the opposite direction.

The gear wheel 23$^m$ is connected to the driving shaft 15 by the pinion wheels 15$^j$ and 15$^k$ fixedly mounted on a counter shaft 15$^l$, journaled in a bearing 15$^m$ and a bearing (not shown) of the inner end 21$^a$ of the sander casing, by an idler pinion 15$^n$ loosely mounted on a stud journal 15$^o$, and a pinion 15$^p$ fixedly mounted on the shaft 15, the pinions 15$^j$, 15$^k$, the idler pinion 15$^n$ and the pinion 15$^p$, being of equal diameters, whereby, on the backward revolution of the shaft 15 the shaft 23 and the mold carrying wheels are revolved rearward at the top and forward at the bottom one sixth of a revolution, and then pause during one revolution of the shaft 15 in the opposite direction. See Figs. 29 and 30.

The two extension plates 21$^d$ of the sander casing have horizontal top portions 21$^q$, which at their front portions have downward hanger extensions 21$^r$, which have integral therewith or suitably attached thereto, the mold receiving supports 24, which have front end portions 24$^a$ angled downward and forward, and rear end portions 24$^b$ angled upward and rearward from their main body portions, which are horizontal and constitute the mold slide track section $d$. See Figs. 46, 47 and 48. Above the slide track section $d$ and forward of the hangers 21$^r$, the plates 21$^d$ have angle bars 24$^c$ secured horizontally thereto to form a shifter track section $d'$ auxiliary to the mold slide track section $d$, and on the track $d'$ is mounted a mold shifter 25 comprising an elongated plate 25$^a$ to the under side of which are secured longitudinally of the plate the parallel axles 25$^b$ on the ends of which are formed spindles that are provided with rollers 25$^c$ which reciprocably support the shifter on the rails 24$^c$. To the end portions of the plate 25$^a$ are secured the rack bars 25$^d$. The front marginal portion 25$^e$ of the plate 25$^a$ is bent downward at a right angle and has secured thereto above its lower edge the angle bar 25$^f$ as shown in Fig. 32 for a purpose hereinafter described.

In suitable bearings in the end plates 21$^d$ of the sander casing above the track $d'$, there is journaled a shaft 25$^g$ on which is fixedly mounted, intermeshing with the rack bars 25$^d$, the gear wheels 25$^h$ adapted in each forward and backward revolution of the shaft to reciprocate the shifter 25 forward and backward on the auxiliary track $d'$. (See Fig. 33).

On the inner end extension of the shaft 25$^g$ there is mounted a sprocket gear wheel 25$^j$ which is connected by a sprocket chain belt 25$^k$ with a sprocket wheel 17$^e$ of equal diameter, whereby when the shaft 17 is revolved alternately forward and backward the shaft 25$^g$ is revolved forward and backward therewith and the shifter 25 is reciprocated in unison therewith but reversely thereto.

The ends 21$^a$ of the sander casing are provided with the bracket plate projections 21$^s$ having the ledges 21$^t$ and above the ledges the inverter axle bearings 21$^u$. (See Fig. 24.)

In the bearings 21$^u$ are journaled the end spindles of the axle 26$^a$ of a mold inverter 26, comprising the axle 26$^a$ and a pair of yokes 26$^b$ having opposite extending pairs of upper and lower yoke arms adapted to receive between them a mold moved by the shifter 25 from the slide track section $d$, when next thereto, and having the upper faces of the lower arms in line therewith. (See Figs. 1, 40 and 41).

The inner bearing 21$^u$ of its outer portion is concentrically recessed to receive a collar 26$^c$ fixedly mounted on the shaft 26$^a$, and having parallel recesses 26$^d$ extending into the collar from diametrically opposite points of the circumference, (as shown in Fig. 14), said bearing 21$^u$ having a hollow boss $21^v$ in its top, with the hole of which one of the recesses $26^d$ is brought into register at each half revolution of the shaft $26^a$. In the boss $21^v$ is loosely mounted a lock bolt $26^e$ which at the end of each half revolution of the shaft drops into a recess $26^d$ and locks the shaft against backward revolution, but is adapted to be lifted up out of the recess into the boss as the shaft is revolved in the opposite direction, whereby the lock pin automatically stops and locks the inverter at the end of each half revolution with the lower yoke arms alined with the track section $d$ in position to receive a mold from the track and hold the inverter against reverse revolution by the weight of the mold.

On the outer end of the shaft $26^a$ is fixedly mounted a gear wheel $26^f$ which intermeshes with an interrupted gear wheel $26^g$, mounted on a stud journal $26^h$ secured to the outer bracket $21^s$ parallel with the shaft $26^a$, the gear wheel $26^g$ having fixedly secured to its hub a sprocket gear wheel $26^j$, which is connected by a chain belt $26^k$ to a sprocket gear wheel $23^q$ fixedly mounted on the outer end of the shaft 23 of the mold carrier of the sander, and adapted during each interrupted one-sixth part of a revolution of the shaft 23 to revolve the sprocket wheel $26^j$ one revolution. The interrupted gear wheel $26^g$ is adapted during one revolution to revolve the inverter 26 one half a revolution, whereby during each interrupted sixth revolution of the shaft 23 in one direction the inverter shaft $26^a$ is revolved a half revolution in the opposite direction for a purpose hereinafter described. (See Figs. 1, 4 and 50).

Opposite the mold feed opening C of the molding machine B is the mold feed section $f$ of the mold slide track, which comprises the supports 28 having suitably mounted thereon the parallel side members $28^a$ and $28^b$ and the intervening top plate $28^c$ forming with the side members the parallel channels $28^d$.

The side member $28^a$ has integral therewith the bracket supports $28^e$ on which, and on the brackets $21^s$ of the sander casing are mounted and secured the end portions of the channel rails 27—27, comprising the return section $e$ of the mold slide track. The side member $28^b$ has integral therewith at the top and level with the plate $28^c$, a ledge $28^f$ which has angled upward therefrom the guide flange $28^g$. (See Figs. 1, 5 and 6.)

The rails 27 have secured thereto within the channels, the angle bars $27^a$ forming the shifter track section $e'$, on which is reciprocably mounted the mold shifter $27^b$ shown in Figs. 34 and 35, and comprising the frame $27^c$ of suitable length, the cross axles $27^d$ secured to the top of the frame and having end spindles on which are mounted the rollers $27^e$, which reciprocably support the shifter on the track section $e'$, and the rack bars $27^f$, which are secured to the under sides of the sides of the frame $27^c$.

The rack bars intermesh with the gear wheels $27^g$ fixedly mounted on the shaft $27^h$, journaled in bearings $27^j$ of the rails 27. (See Fig. 1).

On the inner end extension of the shaft $27^h$ is mounted a sprocket wheel $27^k$, which is connected by a chain belt $27^l$ with a sprocket wheel $15^a$ of greater diameter fixedly mounted on the inner end extension of the driving shaft 15 (see Fig. 30) whereby when the driving shaft is revolved alternately forward and backward, the shifter $27^b$ is reciprocated in unison with the mold shifter 11 of the shifter track $b'$, and the shifters 22 and 23 of the shifter track sections $c'$ and $d'$ respectively, but reversely thereto relatively to the direction of movement of molds on the slide track.

At their outer end portions the side members $28^a$ and $28^b$ of the mold feed section $f$ are provided with alined bearings in which is journaled a shaft $28^h$, on which are fixedly mounted the sprocket wheels $28^j$, one opposite each channel $28^d$, and the opposite end portion of the members $28^a$ and $28^b$ are provided with alined bearings $28^k$ in which is journaled one end portion of a shaft $28^l$ the opposite end portion of which is journaled in a bracket bearing $27^m$ secured to the inner channel rail 27 of the section $e$ of the mold slide track. On the shaft $28^l$ between the bearings $28^k$, and in line with the sprocket wheels $28^j$ respectively, are fixedly mounted the sprocket gear wheels $28^m$ which are connected by the chain belts $28^n$ with the wheels $28^j$ and form with the push plate $28^o$, hinged at the rear edges to the chain belts $28^n$, and extending forward on the belt, a mold shifter 29, reciprocable by the sprocket wheels over the top plate $28^c$ and the ledge $28^f$ forming section $f$ of the mold slide track.

On the inner end portion of the shaft $28^l$ is mounted a bevel gear wheel $28^p$ which intermeshes with a bevel gear wheel $27^n$ fixedly mounted on the shaft $27^h$, whereby the shifter 9 is reciprocated lengthwise of the slide track section $f$ in unison with all the other shifters, but reversely to the shifter $27^b$.

On each rearward motion of each shifter on its respective track section the dog or dogs of the shifter yield and pass under and beyond the mold or molds on the section and on forward movement the dog or dogs engage the molds and push them forward on the slide tracks, as follows:—

The shifter 11 on the forward end portion of the main frame is provided with three pairs of dogs, the inner pair of which engage a mold delivered by the inverter inverted on its pallet on track section $b$, and pushes the mold and its pallet forward on the section to and over the elevator jacks. The next pair of dogs on the forward motion of the shifter engages a pallet having the brick of the next preceding mold of the series and moves the pallet forward a stage on the section, and the third pair of dogs engage a pallet having brick thereon in the position which the second pair of dogs has left it on the next preceding forward stroke, as shown in Fig. 2, and moves it forward on the section $b$ to the position from which it is transferred onto drying cars or other carriers.

The auxiliary frame 12 mounted on the rearward end of the shifter 11 is provided with two pairs of dogs, as shown in Fig. 7, the rearward pair of which engages a mold pushed from the apron A during the next preceding backward stroke of the shifter and moves it forward on the track section $a$ to the position where the mold is provided with a pallet, and the foremost of the pairs of dogs $11^f$ of the frame 12 simultaneously engage a mold left at the pallet covering position on the next preceding forward stroke of the shifter, and moves it into the inverter 14, from which it will be seen that on each forward movement of the shifter 11 three filled molds and two pallets carrying brick are simultaneously moved forward on the sections $a$ and $b$ through respective stages.

The shifter 22 of the track section $c$ has one dog $22^d$ mounted on the rearward end portion of its rack bar $22^a$ in position at the end of its rearward stroke to engage the end of a mold elevated to the swing track rails 20 on the next forward movement of the shifter and during its forward movement to push the mold forward on the track section $c$, the outer extension rail $21^c$ of which (terminating at its connection to the inner top extension plate of the sander casing) permits the mold to drop into the casing edgewise onto the guide flanges $21^l$ which direct it into engagement with a squared face of each mold carrying wheel $23^a$ and in position to be carried by the wheels into locked engagement therewith by the lock blocks $23^e$ at the next succeeding part revolution of the shaft 23.

The front end plate $25^e$ of the shifter 25, on the forward motion of the shifter (which is to be understood to be toward the inverter 26) engages a mold deposited on the track section $d$ by the mold carrying wheels $23^a$, during the next preceding backward stroke of the shifter 25, and pushes it forward into the pair of yoke arms of the inverter 26 next adjacent to the track section $d$, the angle bar $25^f$ also engaging the end portions of the bottom of the mold and preventing the forward part of the mold from tilting downward as it bridges the space between the track section $d$ and the lower arms $26^b$ of the inverter 26.

The shifter $27^b$ of the track section $e$ is provided with two pairs of dogs $27^c$ located, one pair at each end, and pivoted to the sides of the frame $27^c$ and operating similarly as described for the dogs of the other shifters to engage a mold at the beginning of the forward motion of the shifter and move it forward on the track the distance of reciprocation of the shifter. The dogs at the rear end of the shifter engage a mold in the forward pair of yoke arms of the inverter 26 (the mold being then top side up) and delivers the mold to a position midway of the track section $e$. The forward pair of dogs simultaneously engage a mold left in the midway position by the rearward pair on the previous forward stroke of the shifter $27^b$ and move it a stage forward on the track section $e$ onto the feed section $f$. It should be borne in mind, that the forward stroke of the shifter $27^b$ occurs simultaneously with the backward stroke of the shifters 11, 22, 25 and 29 of the track sections $a, b, c, d,$ and $f$ and simultaneously, (1), with a half revolution of the inverter 14 that lifts a mold covered by a pallet from the track section $a$ and deposits it forward on the stepped down track section $b$ inverted on its pallet, (2) with the raising of the elevator jacks 19 that lift a mold from a pallet on the track section $b$ and deposit it on the swing rails 20 of the track section $c$, and (3), that slightly precedes in its beginning a half-revolution of the inverter 26, whereby a mold in the rearward pair of yoke arms is deposited top side up on the track section $e$ in the position occupied by the mold engaged and moved forward by the rearward pair of dogs of the shifter $27^b$ on its forward motion.

At the beginning of each sixth part of a revolution of the mold carrying wheels $23^a$ of the sander casing there are three molds secured thereto in the second, third and fourth positions, as shown in Fig. 4, and a mold in the first position ready to be secured and transferred to the second and lowermost position, during the part revolution about to begin, and a supply of sand, being in the molds in the second, third and fourth positions, as shown in Fig. 4, and a mold in the first position ready to be secured and transferred to the second and lowermost position, during the part revolution about to begin, and a supply of sand, being in the molds in the second, third and fourth positions, as the empty mold in the first position passes to the second and lowermost position, sand from the other three molds will partly gravitate into it, and the mold in the uppermost position, as it is carried upward, is released from engagement with the wheels $23^a$ by the lock blocks $23^e$ by reason of their having passed the upper ends of the locking ribs $21^p$, and the upper side of the mold engages the downwardly and forwardly inclined front end portions 24$^a$ of the mold supports 24 forming the track section $d$, upon which the mold rides upward until the center of gravity is above the inclined guide portions and causes it to topple over onto the supports 24 in a horizontal position as the wheels 23$^a$ stop, and any sand not adhering to the inner surface of the mold falls by gravity into the molds beneath, whereby it will be seen that during each sixth part of the revolution of the mold carrying wheels 23$^a$ four molds are each moved one step forward and one of the four is delivered sanded on the track section $d$.

The mold shifter 29 of the feed track section $f$ comprises the sprocket chains 28$^n$ and the push plate 28$^o$ hinged thereto as described.

At the beginning of the forward movement of the shifter 29 the inner edges of the shifter push plate 28$^o$ is slightly beyond the line of the outer rail 27 extended, and in position to engage a mold delivered on the track section $f$ during the preceding forward movement of the shifter 27$^b$.

To operate the driving shaft 15, connected directly and indirectly as described to the several mold shifters, the mold inverters, the mold elevator, and the mold sander, in a fixed and definite time relation to the reciprocation of the mold ejector B' of the molding machine B, there is concentrically attached to the gear wheel B$^2$ which revolves the shaft B$^3$ that operates the mold filling plunger (not shown) (and to a crank pin B$^4$ of the wheel B$^2$ is connected the pitman B$^5$, that reciprocates the mold ejector B' by the spring resisted or weighted rock arms B$^6$, mounted on the rock shaft B$^7$, having a rock arm B$^8$ to which a slotted end portion of the pitman B$^5$ is attached), a sprocket wheel 30 that is connected by a sprocket chain belt 30$^a$ to a sprocket wheel 30$^b$ of equal diameter with the wheel 30, and that is fixedly mounted on a shaft 30$^c$ having a crank 30$^d$. to the pin 30$^e$ of which is pivotally connected one end of a reciprocating driving rod 31, having its opposite end portion formed as a rack yoke 31$^a$ which is mounted on and is in intermeshable engagement with the driving gear wheel 15$^a$ of the driving shaft 15, and adapted to alternately revolve the shaft a complete revolution forward and backward respectively during each forward and backward stroke of the driving rod 31. The crank pin 30$^e$ of the crank 30$^d$ being located at the same degree of its circle as the crank pin B$^4$ of the wheel B$^2$ is located in its circle, before the chain belt is adjusted to the sprocket wheels 30 and 30$^b$, as shown in Figs. 1 and 44, the backward stroke of the driving rod 31 will occur simultaneously with the forward movement of the ejector B', and by reason of the quick return movement of the mold ejector B' by the springs or weight of the rock arms B$^6$, which is permitted by the slot in the pitman B$^5$, and by reason of the dead centers of the driving rod 31 being horizontal and 90° from the dead centers of the pitman B$^5$, the return movement of the ejector is completed before the forward movement of the driving rod begins.

In this connection it should be noted that the driving rod 31, by reason of the rocking of the rack 31$^a$ on the driving wheel 15$^a$ practically ends and begins its stroke before reaching and after passing its true dead centers, and in Fig. 1 the angle of the crank 30$^e$ from the horizontal, shows the position of that crank pin 30$^d$ when the forward stroke of the driving rod ends, and the backward stroke begins at the same angle above the true dead center by reason of which, the wheel 15$^a$ is made of a diameter relative to the rack bar to produce a full revolution of the shaft 15 during each stroke of the driving rod. However, it is obvious, that by providing the driving rod 31 with a slotted cross head movable in horizontal guide ways, with the crank pin 30$^d$ extending into the slot of the cross head, a horizontal reciprocation of the rod will be produced, and the lost motion of the rack avoided, without changing the characteristic speed movement of the driving rod 31, and I therefore do not limit myself to an oscillating connection of the driving rod with the crank pin.

To operate the apparatus shown and described requires a series of fifteen molds, three of which are always on the apron filled, and one filled mold and one empty mold are in the machine at the beginning of the backward stroke of the driving rod 31, at which time the other ten molds are distributed at intervals of the mold slide track, as follows:—one mold on the track section $a$ midway between the inverter 14 and the apron A, one mold covered by a pallet in the inverter 14, and still resting on the track section $a$, one mold on the track section $b$ inverted on a pallet over the elevator jacks 19, four molds in the sander casing located on the mold carrier 23 in positions as shown in dotted lines in Fig. 4, two molds in the mold inverter 26, as shown in full lines in Fig. 4 and one mold midway of the track section $e$, as shown in dotted lines in Fig. 1.

At the beginning of the backward stroke of the driving rod 31, the ejector B$^5$ begins to push the empty mold in the machine forward, thereby pushing the empty mold in the machine into position to be filled by the press plunger, (which is then on its upward movement), and the filled mold onto the apron A (as shown in Fig. 44), and one filled mold from the apron onto the track section
*a*. At the same time the driving member 31
reciprocates the shifter 11 backward, thereby
moving the strike knife 12ʰ over two molds
and partly over the third mold on the apron
A, also rotates the inverter 14 a half revolution to deliver the mold therein inverted
on its pallet forward onto the track section
*b*, also raises the elevator jacks 19 and lifts
the mold from its pallet and delivers it onto
the swing rails 20 of the track section *c*,
(as shown in dotted lines in Fig. 2) and as
hereinafter more particularly described, also
partly revolves the mold carrier wheels 23ᵃ
of the sander casing and delivers the fourth
and upper mold shown in dotted lines in
Fig. 4 onto the track section *d*. Also operates the shifter 22 of the section *c* to return the shifter from position over the
sander casing to position over the elevator
jacks, and to drop the drop hammer 20ᵇ on
the mold over the jacks as they start to lift
the mold. Also moves the shifter 25 of the
track section *d* on its backward motion relative
to the direction of travel of the molds,
as shown by the arrows in Fig. 4. Also moves
the shifter 27ᵇ of the mold track section *e*
forward to simultaneously engage the mold
in the forward arms of the inverter 26 and
the mold central of the section *e* and moves
the mold in the inverter 26 forward into the
central position, and the mold in the central
position forward onto the feed section *f*, and
by reason of the interrupted gear wheel 26ᵍ,
after the forward mold in the inverter has
been moved therefrom by the shifter 27ᵇ,
the driving member also operates the inverter to deliver the mold in the rearward
arms of the inverter onto the track section *e*.
Also moves the mold shifter 29 of the feed
section *f* outward, the direction of movement
of all the shifters, the inverters, the
elevator and the sander, on backward motion
of the driving rod 31, being shown in
Figs. 1, 2, 3 and 4 by arrows. Also during
the last half of the backward stroke of the
driving rod 31ᵈ, the ejector B′ moves quickly
backward to its position of rest, under the
action of the spring weighted arms B⁶.
During the forward stroke of the driving
rod 31 the shifters are all moved simultaneously
in the direction opposite to that
shown by the arrows in Figs. 1, 2, and 4,
while the inverters, the elevator and the mold carrier wheels of the sander remain at
rest, and molds are simultaneously moved
forward a stage by the respective shifters
as follows: by the shifter 11 on the track
section *a* one mold forward from the apron
to the midway position where it is covered
by a pallet, and one mold covered by a pallet
from said midway position forward into the
inverter 14, one mold inverted on its pallet
from the inverter 14 to and over the elevator,
on track section *b*, one mold by the shifter 22 from the swing rails 20 of the
track section *c* to and into the sander casing,
one mold on the track section *d* by the
shifter 25 into the inverter 26, and one mold
on the feed section *f* to and into the machine.

The reciprocation of the driving rod 31 being
produced by a crank its stroke in either
direction begins slowly from a state of rest
at one dead center and increases in speed
during the first half of the stroke and
gradually diminishes in speed during the last
half of the stroke to a state of rest at the
opposite dead center of the rod.

This characteristic speed movement of
the drivng rod 31 is imparted by it to the
reciprocation of each one of the shifters, as
well as to the movements of each of the other
moving parts of the apparatus, and constitutes
one of the main features of my invention
in that in the movement of molds forward on the several sections of the slide
track the slow starting and gradual stopping
of the movable parts insures against any
violent bumping of the molds that would be
injurious to the brick in the filled molds and
against loosening the sand from the sides of
the empty molds, after sanding.

Another necessary feature of my invention
is to so connect the driving rod 31 with
the crank shaft operating the press plunger
and the ejector of the machine B as to operate
the shifters of the several sections to
deliver a mold to the feed section *f* simultaneous
with the ejection of a mold from the
machine and to operate the shifter 29 of the
feed section to deliver an empty mold into
the machine for filling, between the time of
the backward movement of the ejector and
its next forward movement, which is the
only time that a mold can be introduced
therein.

To accomplish this, it is necessary to so
adjust the crank pin 30ᵉ of the shaft 30ᶜ that
it is in the same degree of the circle of its
movement that the pin B⁴ is in the circle
of its movement, and that the two pins shall
complete a revolution in the same time. Being
so adjusted and connected, the dead centers
of the pitman B⁵ are substantially at
vertical diametric points of the circle of
movement of the pin B⁴ and the dead centers
of the driving rod 31 are substantially at
horizontal diametric points of the circle of
the crank pin 30ᵉ, from which it will be seen
that the driving rod 31 completes the first
half of each stroke as each corresponding
stroke of the pitman begins.

By reason of the bell crank connection
between the pitman B⁵ and the ejector B⁴,
the upward and downward movement of the
pitman produces a forward and backward
horizontal reciprocation of the ejector reversely
to the reciprocation of the pitman.
By reason of the slot in the lower end portion
of the pitman B⁵ and of the bell crank being weighed to normally and yieldingly hold the ejector in its rearward position, and of the distance of the reciprocation of the ejector being less than the radius of the crank pin $B^4$, the pitman $B^5$ does not begin to move the ejector forward until the beginning of the last half of its upward stroke, and completes the forward movement of the ejector at the end of its upward stroke, at which time the driving rod 31 is beginning the last half of its backward stroke, during which the ejector is moved quickly backward by its weights to its normay rearward position, where it rests while the driving rod 31 completes its rearward stroke and the first half of its forward stroke which occurs simultaneously with the last half of the downward stroke of the pitman, during which first half of the forward stroke of the driving rod 31, a mold has been moved by the shifter 29 on the feed track section into the feed opening C, and while the ejector idles through the first half of the upward stroke of the pitman, the driving rod 31 completes the last half of its forward stroke, whereby the forward movement of the shifter 29 is completed and the mold is fully introduced between the ejector and the filled mold under the press plunger, before the ejector begins to move forward.

From the foregoing it will be seen that by imparting the motion of the driving rod 31 to each of the moving parts of my apparatus I secure such precise and harmonious time relation between the movement of the several parts of the molding machine that the apparatus becomes in effect a part and parcel of the machine B whereby all of the operations necessary to produce brick mounted on pallets ready for the driers, except supplying the clay and the pallets, are automatically accomplished.

It is manifest that the driving member 31 may be connected directly to the crank pin $B^4$ of the machine B instead of indirectly therewith by the crank pin $30^e$ of the crank $30^d$ the shaft $30^c$, the sprocket wheel $30^b$, the chain belt $30^a$ and the sprocket wheel 30, without changing the time relation or direction of its reciprocation relative to the reciprocation of the ejector $B^5$, and I therefore do not limit myself to the connecting means shown and described.

Such direct, indirect or other equivalent connection of the driving member 31 with the crank pin $B^4$ or its equivalent, whereby the apparatus is automatically operated by the machine in a definite and fixed time relation with the movement of the press plunger and ejector of the machine is however essential to the feeding of the molds into the machine at the only times in the operation of the machine they can be introduced therein, and such connection or its equivalent of the driving member 31, whereby through its reciprocation I secure a periodic advancement of a series of molds on the slide track, one following another from the apron to the mold feed opening and into the machine, and at a time following each discharge of a mold therefrom, constitutes one of the main features of my invention.

By such or equivalent connection of the driving member 31 there is imparted to it and through it to all the other moving parts of my apparatus, the characteristic slow starting, gradually increasing, and then gradually decreasing to a stop motion that is produced by crank reciprocation, whereby such character of movement of the molds is produced in each and every stage of the travel of each and every mold from the apron back into the machine, which also constitutes one of the main features of my invention.

In this connection it should be noted that the driving rod 31 by reason of the rocking of the rack $31^a$ on the driving wheel 15 practically ends and begins its strokes before reaching and after passing its true dead centers, and in Fig. 1 the angle of the crank $30^d$ from the horizontal shows the position of the crank pin $30^e$ when the forward stroke of the driving rod ends, and the backward stroke begins at the same angle above the true dead center, by reason of which the wheel $15^a$ is made of a diameter relative to the rack bar to produce a full revolution of the shaft 15 during each stroke of the driving rod.

However, it is obvious that by providing the driving rod 31 with a slotted cross head movable in horizontal guide ways with the crank pin $30^e$ extending into the slot of the cross head a horizontal reciprocation of the rod will be produced and the lost motion of the rack avoided without changing the characteristic speed movement of the driving rod 31, and I therefore do not limit myself to an oscillating connection of the driving rod with the crank pin.

As hereinbefore described during each forward stroke of the driving rod 31 a mold inverted on a pallet is pushed forward by the shifter 11 from the lower yoke arm of the inverter 14 on the track section $b$, over and in position to be engaged by the elevator jacks 19. The operation of lifting the inverted mold from its pallet and the brick therein and depositing it on the elevated section $c$ is more particularly described as follows:—

At the beginning of the backward stroke of the driving rod 31, the direction of revolution of the driving shaft 15 is reversed, which moves the shifter 11 backward, which revolves the shaft 18 forward, which revolves the lifting wheels $18^b$ forward, and lifts the jacks 19 in the manner hereinbefore described. Simultaneous therewith begins the backward motion of the shifter 22, the trip dog 20$^g$ of which at the moment that the jacks 19 begin to raise the mold from its pallet, engages the pin 7$^y$ of the lock cam, plate 7$^x$ and releases the drop hammer plate 20$^b$, which in dropping first strikes the cushion springs 20$^d$, which yield to allow the hammer plate to strike the bottom of the mold and slightly rebound therefrom. The jar received by the mold when only slightly raised loosens the brick in the mold and insures that the alternate short lifts of the two jacks by the teeth bars 18$^d$, 18$^e$, 18$^f$, 18$^g$ and 18$^h$ at the beginning of their upward motion will lift the mold gently from the brick in a manner similar to the manual movement of the mold employed in hand dumping. In this upward movement of the mold by the jacks, as soon as the mold is freed of the brick, the teeth bars 18$^j$, 18$^k$, 18$^l$, 18$^m$, 18$^n$ and 18$^o$ successively lift the mold increased distances whereby the mold is raised between and above the swing rails 20, the mold engaging the rollers 20$^a$, and swinging the rails upward until the mold has passed the rails when the rails drop back to their normal position, at which time the last teeth bars 18$^o$ engage and then release, substantially at the same time, the jacks 19, which drop back on the cushion springs 7$^h$ to their normal position. In so doing the mold is left on the rollers 20$^a$.

In rising, the mold carries with it the drop hammer plate 20$^b$, which, when the mold drops back on the rollers, is held in its raised position by the lock cam plate 7$^x$.

To avoid the occasional soaking of molds required to put them in condition to retain sand on the inner surface, and the necessity of having different sets of molds to permit such soaking when one set becomes too dry, as is required in operating mud brick machines, I preferably provide my apparatus with means for spraying the inner surface of each mold of the series employed each time after it is emptied of its brick and before it is dropped into the sander casing as hereinbefore described. These means comprise a surface pipe 32 connected to a water supply under sufficient pressure and having a nozzle 32$^a$ adapted to form a vapor spray, and having a controlling valve 32$^b$ adapted to close and open the pipe, and provided with an operating handle 32$^c$ having a spring adapted to automatically operate the handle to close the valve after it has been used to open the valve and released. The nozzle is located centrally between and slightly below the extensions 21$^b$ and 21$^c$ of the swing rails 20 of the track section $c$ and adjacent to the inner support 7, and the handle 32$^c$ projects upward in the path of the mold, the forward end of which engages the handle 32$^c$ as it passes from the swing rails 20 and opens the valve until the mold has passed the handle, when the handle automatically closes the valve.

I am aware that others have obtained patents on apparatus designed to be used with brick molding machines in part for a like purpose, wherein molds are moved in part on carriers continuously moving in one direction, and in part by gravity over inclines, but I have found that the machines therein described have never been in public use with brick molding machines, and I have also found, in practice and by experiment, that machines constructed in accordance with the principle of construction shown and described in said patents are inoperative as automatic machines, and that only by positive, definite and certain periodic movement of molds occurring in periods complementary to the periods of discharge of molds from the machine as herein described, can an automatic apparatus of the kind and for the purpose described be successfully operated, and I therefore limit my claims hereinafter set forth, to means adapted to produce the consecutive, periodic advancement of the molds by stages, with pauses after each advancement, over a path of travel that extends from the apron of the mold feed opening, that is characteristic of all the movements of molds produced by my apparatus and whereby I secure the definite and certain return of each mold of a series, one following the other in the order of their discharge from the machine, to and into the machine, emptied and sanded for refilling, at the exact time the machine is ready to receive a mold.

What I claim to be new is—

1. In an apparatus of the kind and for the purpose described, the combination with the apron, crank shaft, press plunger and ejector of a mold filling brick machine, of a mold slide track connecting the apron with the mold feed opening of the machine, said track comprising a plurality of sections, a mold shifter for each section, each shifter reciprocable forward and backward along its respective section, an auxiliary crank connected to the crank shaft of the machine and revoluble thereby in unison therewith, and in fixed time relation to the cranks of the press plunger and ejector, a main driving member connected to the auxiliary crank and reciprocable thereby forward and backward between points of rest at the dead centers of the auxiliary crank in a fixed and definite time relation to the forward and backward movement of the ejector and the upward and downward strokes of the press plunger, as set forth, means severally connecting each mold shifter with the main driving member and adapting the driving member to reciprocate the mold shifters in unison therewith, and by like speed motion, and whereby a series of molds consecutively delivered from the machine over the apron on the track, are consecutively returned over the track sections, and fed emptied and sanded into the machine for refilling, substantially as set forth.

2. In an apparatus of the kind and for the purpose described, the combination with the apron, crank shaft, press plunger and ejector of a mold filling brick machine, of a mold slide track connecting the apron with the mold feed opening of the machine, said track comprising a plurality of sections, a mold shifter for each section, each shifter reciprocable forward and backward along its respective section, a plurality of mold transfer members severally adapted as set forth to receive a mold advanced on a track section by the shifter of the section and transfer the mold to the next succeeding track section, an auxiliary crank connected to the crank shaft of the machine and revoluble thereby in unison therewith, and in fixed time relation to the cranks of the crank shaft connected to the press plunger and ejector respectively, a main driving member connected to the auxiliary crank, and reciprocable thereby forward and backward between points of rest at the dead centers of the auxiliary crank, in a fixed and definite time relation to the forward and backward movements of the ejector and the upward and downward strokes of the press plunger, as set forth, means severally connecting each mold shifter and transfer member with the driving member and adapting the driving member to reciprocate the mold shifters and operate the transfer members by like speed motion, as set forth, to consecutively advance a series of molds, as delivered on the track from the machine, over the track sections from the apron to and into the mold feed opening of the machine, emptied and sanded for refilling, substantially as set forth.

In testimony whereof I have hereunto set my hand at Toledo, Ohio, this 22nd day of November, 1913, in the presence of two subscribing witnesses.

WILLIAM SHERIDON.

In presence of—
JOHN E. CONNELL,
MARION LAMBERTON.

Copies of this patent may be obtained for five cents each, by addressing the "Commissioner of Patents, Washington, D. C."